Nov. 24, 1936.  J. FECHTNER  2,061,834
BEET HARVESTING MACHINE
Filed Aug. 9, 1935  7 Sheets-Sheet 3
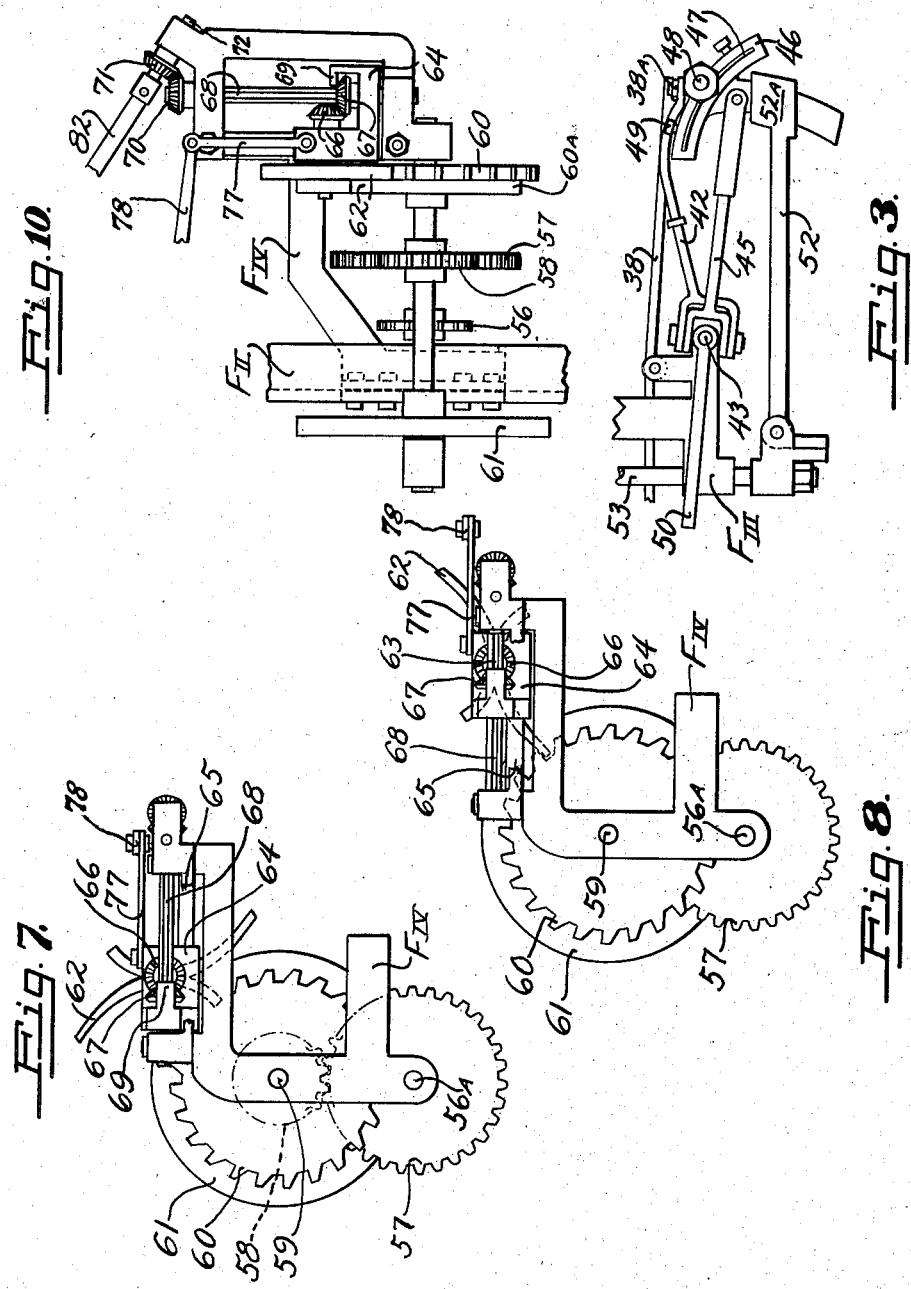
INVENTOR.
Josef Fechtner.
BY Arlington␣␣White
ATTORNEY.

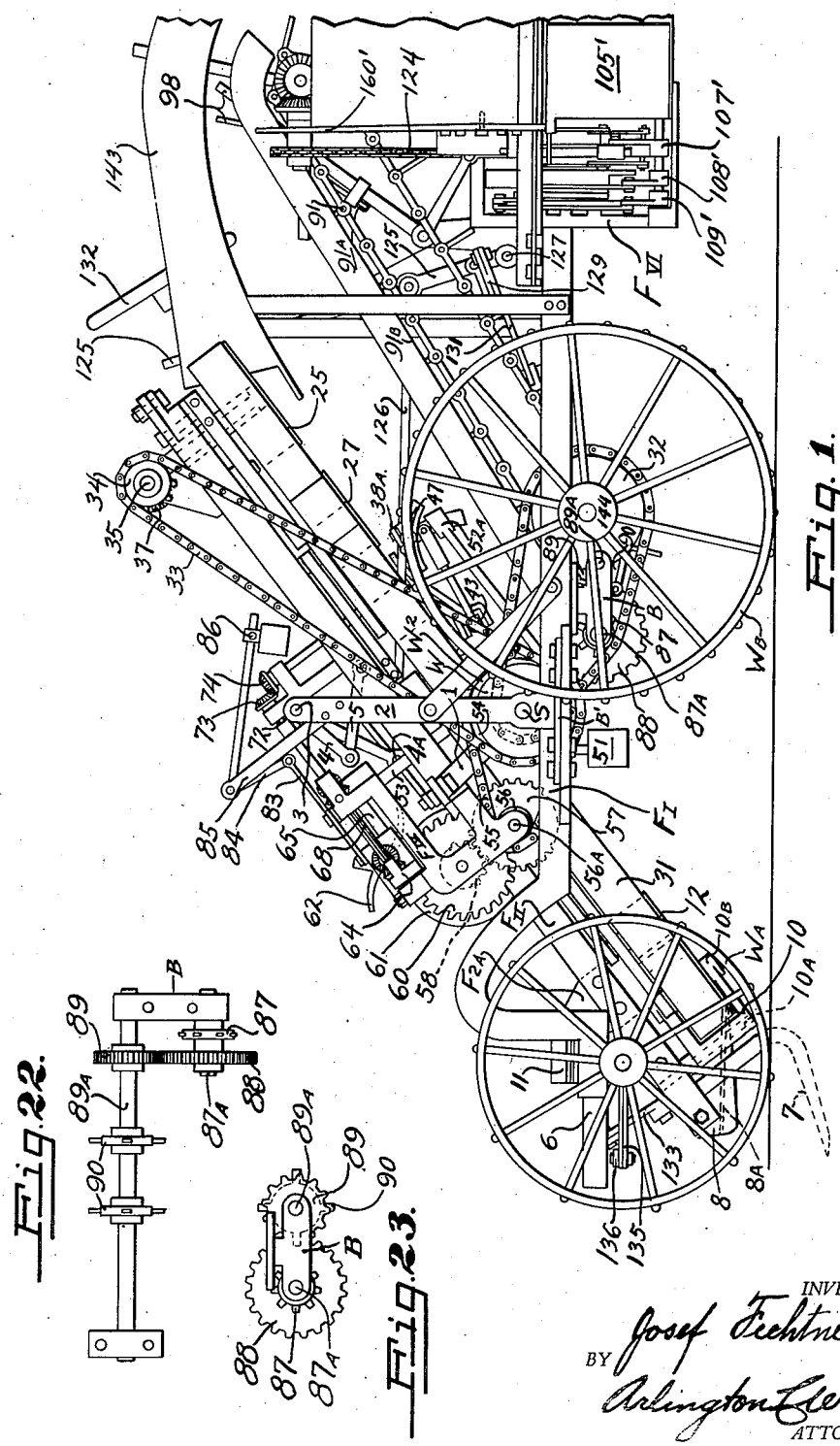

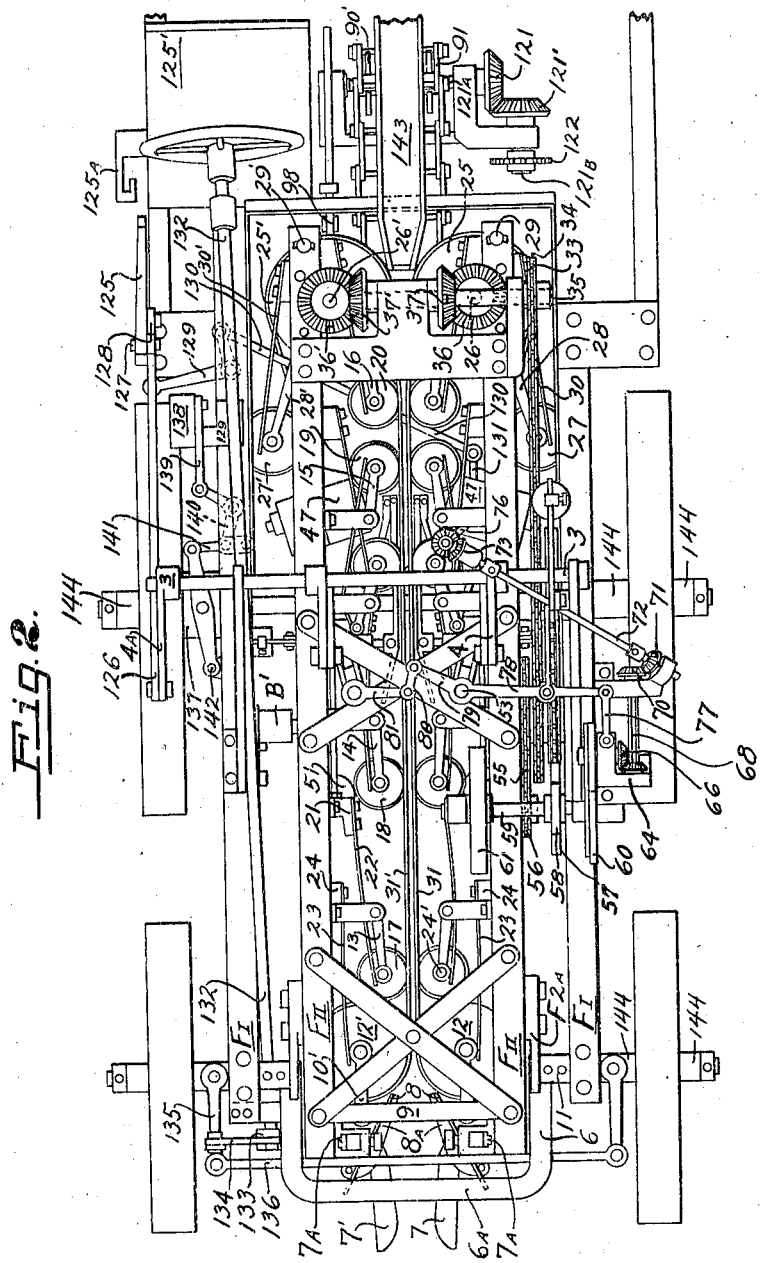

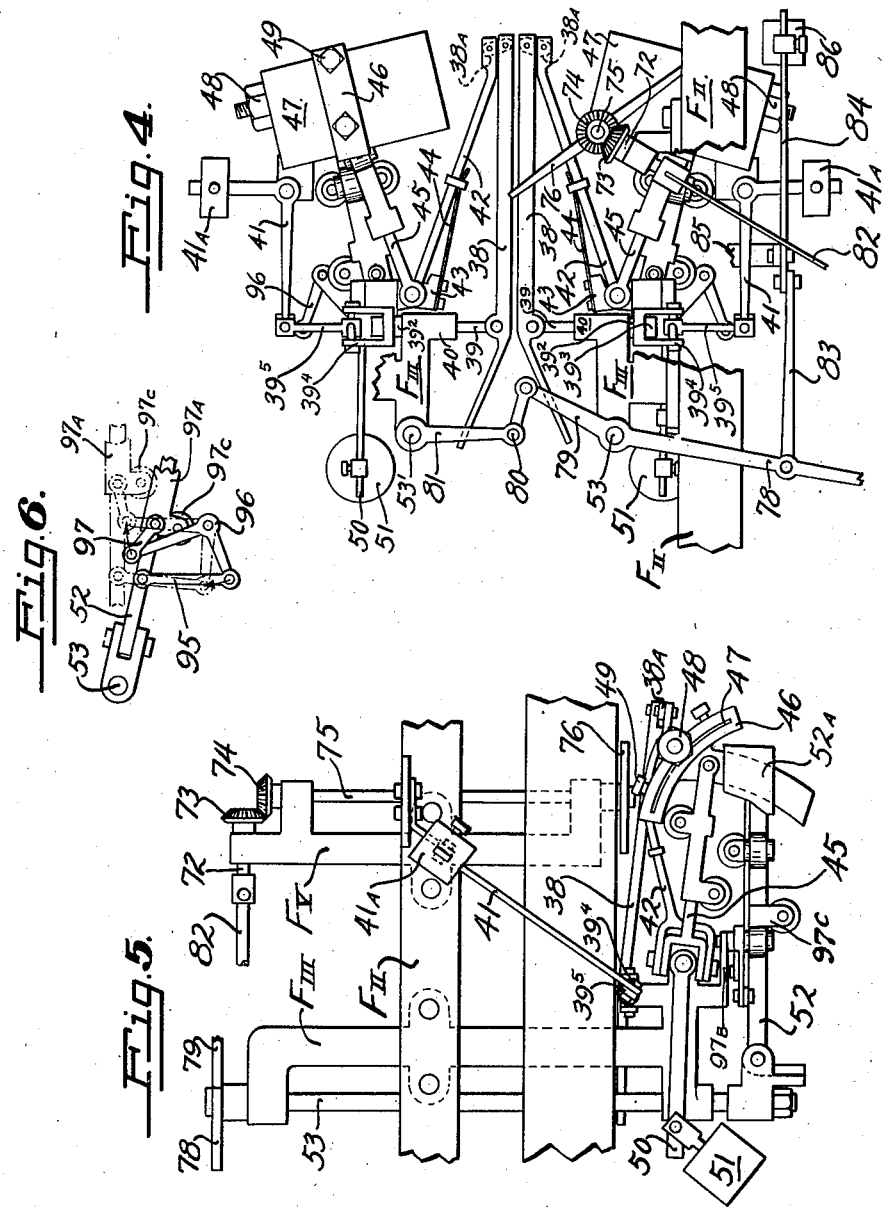

Nov. 24, 1936.  J. FECHTNER  2,061,834
BEET HARVESTING MACHINE
Filed Aug. 9, 1935  7 Sheets-Sheet 5
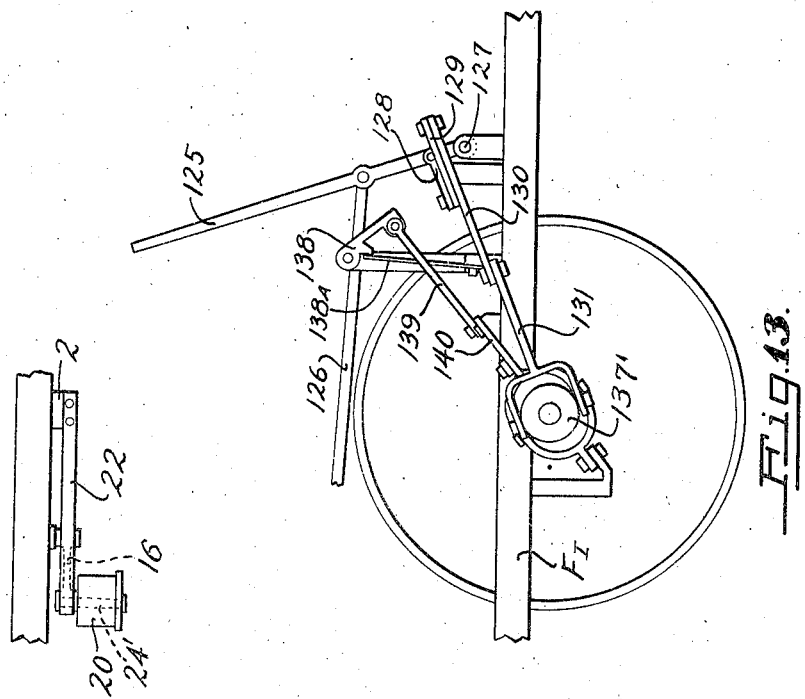
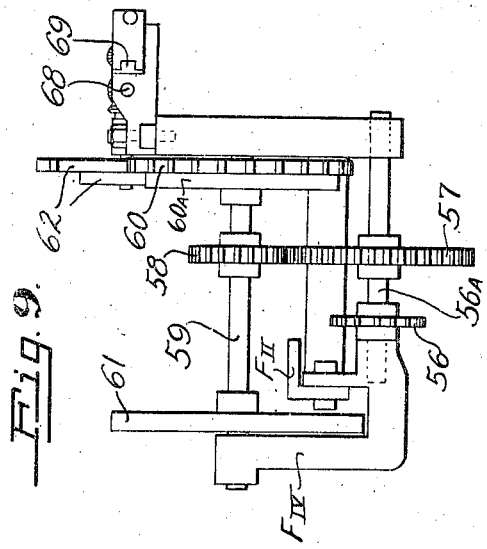
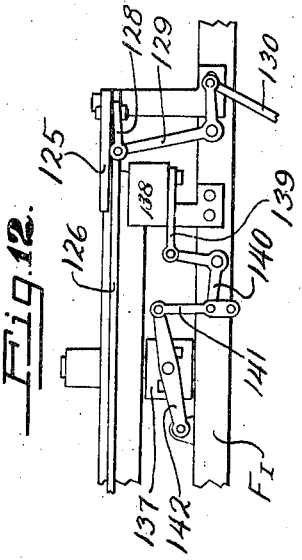
INVENTOR.
Josef Fechtner
BY Arlington White
ATTORNEY.

Nov. 24, 1936.   J. FECHTNER   2,061,834
BEET HARVESTING MACHINE
Filed Aug. 9, 1935   7 Sheets-Sheet 6
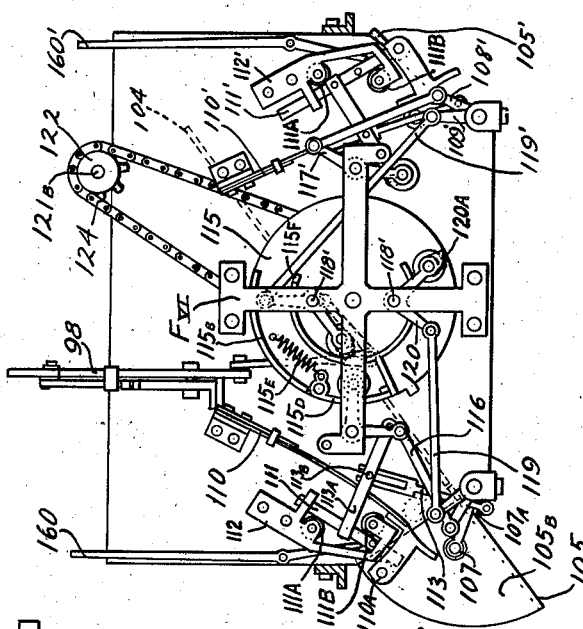
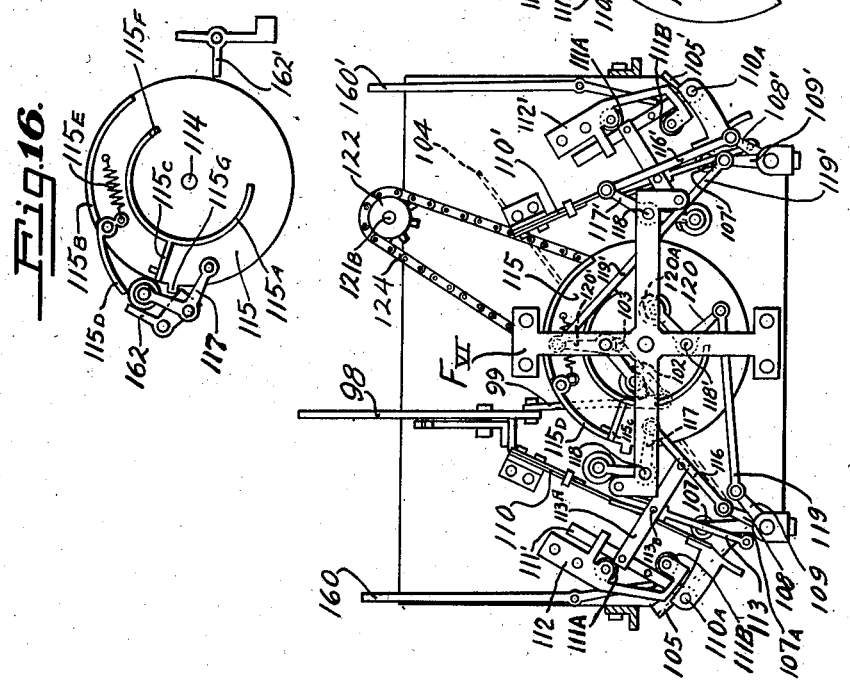
INVENTOR.
Josef Fechtner
BY Arlington E. White
ATTORNEY.

Nov. 24, 1936.  J. FECHTNER  2,061,834
BEET HARVESTING MACHINE
Filed Aug. 9, 1935  7 Sheets-Sheet 7
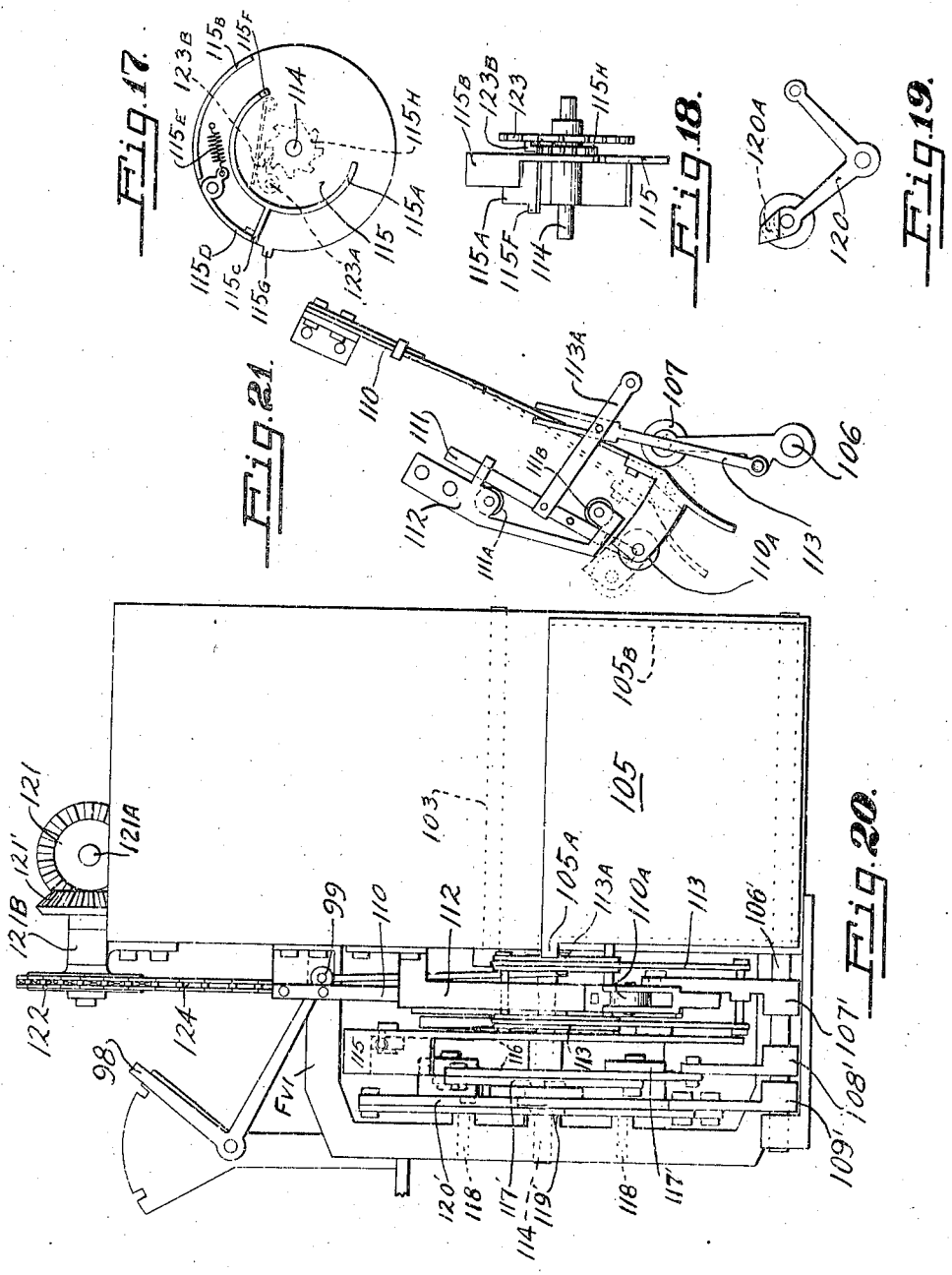

Patented Nov. 24, 1936

2,061,834

UNITED STATES PATENT OFFICE 2,061,834

BEET HARVESTING MACHINE

Josef Fechtner, San Francisco, Calif.

Application August 9, 1935, Serial No. 35,477

7 Claims. (Cl. 55—108)

The invention, in general, relates to devices which are adapted to traverse a field of crops and simultaneously to gather the same. More particularly, the invention relates to an improved machine of the character specified which is especially adapted and designed for the pulling and topping of beets and like crops.

A primary object of the invention is to provide a beet harvesting machine which affords a maximum amount of harvesting with a minimum of labor and in a minimum of time.

Another object of my invention is to provide a machine of the aforementioned character which is relatively simple to operate and which is readily handled on short turns at the ends of the fields.

A still further object of the invention is to provide improved unloading mechanism in a harvesting machine.

Other objects of the invention, together with some of the advantageous features thereof, will appear from the following description of the preferred embodiment of my invention which is illustrated in the accompanying drawings. While I have shown the preferred embodiment of the invention in the drawings, it is to be understood that I am not to be limited to the embodiment shown, as the invention, as defined in the appended claims, may be embodied in a plurality and variety of forms.

Referring to the drawings:

Figure 1 is a side elevation of an embodiment of the invention.

Figure 2 is a view looking into the face of the inclined frame FII of the device and normal to such frame.

Figure 3 is an enlarged detail view of cutter adjusting mechanism and cutters.

Figure 4 is an enlarged detail of the beet topping mechanism and follow-up devices for the cutters.

Figure 5 is a side view of the topping mechanism illustrating the means for initiating the same.

Figure 6 is a detail of a portion of the follow-up system for the beet cutters.

Figure 7 is a side view of the mechanism for actuating the cutter-holding arms.

Figure 8 is also a side view of the mechanism for actuating the cutter-holding arms with the parts in a different position than that shown in Figure 7.

Figure 9 is an end view of the mechanism illustrated in Figures 7 and 8.

Figure 10 is another view of the mechanism illustrated in Figure 9.

Figure 11 is an enlarged detail showing one of the sets of pulleys, pulley-holders, springs and spring-holders for regulating the beet conveyor.

Figure 12 is a plan view of mechanism for handling the machine on short turns.

Figure 13 is a side view of the same mechanism illustrated on Figure 12.

Figure 14 is a rear view of the embodiment of my invention shown in Figure 1 and illustrates the mechanism for automatically opening and closing of hopper doors for discharging the topped beets.

Figure 15 is a view similar to the showing in Figure 14 except that one of the hopper doors is shown in open position.

Figure 16 is a detail of a portion of the automatic actuating mechanism for operating the hopper doors.

Figure 17 is a view of certain elements of the hopper opening and closing mechanism.

Figure 18 is a side view of the elements shown in Figure 17.

Figure 19 is an enlarged view of another element of the hopper discharging mechanism.

Figure 20 is a side view of the hopper and mechanism employed for automatically opening and closing hopper doors.

Figure 21 is an enlarged detail of a portion of the automatic discharging mechanism associated with the hopper.

Figure 22, see Sheet 1, is an elevation of a portion of the driving mechanism associated with the rear axle of the machine.

Figure 23, see Sheet 1, is a side view of the mechanism shown in Figure 22.

In its preferred form, the beet pulling and topping machine of my invention preferably comprises a vehicle adapted to be advanced over a field of crops, means on said vehicle for severing the beets from the soil and means operable by the advance of the vehicle for conveying the beets to topping mechanism, together with means for positioning the beets for topping while being conveyed to the topping mechanism, means for actuating the topping mechanism, means for conveying the topped beets to a hopper during the advance of the vehicle and automatic means for discharging the topped beets from the hopper and for closing the hopper doors after discharge of the beets.

The beet pulling and topping vehicle of my invention includes a pair of front ground-engaging wheels $W_A$, together with a pair of relatively large rear ground-engaging wheels W_B. The wheels W_A and W_B support a main vehicle frame FI which in turn supports a superstructure consisting of frames FII to FVI inclusive for supporting various operating mechanisms and elements hereinafter described.

As illustrated in Figure 1 of the drawings, the frame FI is off-set adjacent the front of the vehicle to provide clearance for the front wheels W_A when the machine is making short turns. Mechanism for permitting short turns by the vehicle is illustrated in Figures 12 and 13 of the drawings and hereinafter specifically described.

In accordance with my invention, I provide a relatively large inclined frame FII for carrying the beet pulling, beet leaf bending and holding mechanism as well as conveying mechanism to transmit the beets to the cutters. As illustrated in Figure 1, the inclined frame FII is movably supported upon frame FI by means of pivotally mounted V-shaped supports 1 on pins 5 which are connected to brackets B' secured to opposite sides of frame FI. Uprights 2, which are secured to frame FI, carry rod 3 to which are secured a pair of arms 4, which in turn are linked to frame FII by a pair of links 5. The movable frame FII is adapted to be raised and lowered from and to working and road position by mechanism from the operator's seat, as hereinafter specified. The frame FII, in its lowered or working position is partially supported on the front axle 6 of the vehicle by means of the hooks F2A which are fastened to the forward end of frame FII. It is to be noted that the front axle 6 is formed with a forward projecting portion 6A to provide for clearance of the frame FII, and attached parts, as it is lowered and raised.

As is well known, it is customary to plant beets in spaced rows and at spaced intervals in the rows, and the vehicle of my invention is designed so that the ground engaging wheels straddle a row of beets as it progresses across a field. To loosen and lift the beets from the soil, I have provided a pair of blades 7 and $7^1$ which are laterally adjustably secured by means of plates 7A to the leading end of the frame FII. As the machine advances over the field, the beets are loosened and lifted by the blades 7 and $7^1$ and carried back toward the transverse center of frame FII. During this movement, the leaves of the beets are pressed inwardly, by means of plates 8 secured to the frame just back of the blades, and beets which are lifted too high are pressed downwardly to below the belts by the plates 8A secured to the frame FII at substantially right angles to the plate 8. In addition to plates 8 and 8A, I provide a transversely disposed plate 9 on the frame FII adjacent to the plates 8 and 8A, for folding the leaves of the beets in a generally backward direction so that endless belts, described below, for conveying the beets to the cutters may more readily grip a relatively large number of the leaves, and thereby assist in pulling the beets from the ground.

As illustrated particularly in Figure 2 of the drawings, the various elements for supporting, adjusting and tightening the beet conveyor belts are supported by the movable frame FII and include a pair of U shaped pulley holders 10 and $10^1$, with side movement, mounted on pins $10_A$ in holders $10_B$ secured to frame FII. By adjustment of plates 11, the elevation of the endless belts may conveniently be regulated. The holders 10 and $10^1$ support a pair of front pulleys 12 and $12^1$ over which the beet conveyor belts are trained.

A plurality of pulley holders 13, 14, 15 and 16, are provided for supporting relatively small pulleys 17 to 20, inclusive, which press against the conveyor belts to move the belts toward each other so that the beets are held by their leaves between the belts as they are conveyed toward the cutters. The conveyor belts may have smooth surfaces but, if desired, relatively thin strips of small dimensions can be provided on the outer surface of each belt at spaced intervals to assist in gripping the beet tops. This is especially desirable in the event that in use, the belts become quite moist and slippery. Spring means preferably are employed for urging the small pulleys against the conveyor belts, and to this end I provide a plurality of spring holders 21 which are secured to the frame FII and to which are fastened springs 22. Springs 23, mounted in holders 24 which are fastened to frame FII, are provided for urging the pulleys 12 and $12^1$ toward each other. Spindles $24^1$ serve to connect the various pulley holders to the several pulleys. The belts are also trained over a pair of rear pulleys 25 and $25^1$, which are secured to shafts 26 and $26^1$ journaled in bearings carried by the frame FII. In addition to the foregoing elements for adjusting the conveyor belts, I have provided belt tightening pulleys 27 and $27^1$, movably supported by arms 28 and $28^1$ respectively, which are pivotally mounted to the frame FII. For urging the pulleys 27, $27^1$ against the belts, I again employ spring means and to this end provide spring holders 29 and $29^1$ for springs 30, $30^1$ which are adjustably mounted upon the frame FII.

In order to move the conveyor belts 31 and $31^1$, I preferably provide a pair of chain drives, one from the rear axle of the vehicle, although other drive means may be employed, as desired. In this embodiment of my invention, see Figure 1 of the drawings, a sprocket wheel 32 is secured to a clutch on the rear axle and placed in driving connection with a sprocket wheel W movably mounted on the pin S. A second sprocket wheel $W^2$ is carried by the pin S and is connected by means of the chain 33 to a sprocket wheel 34 which is fastened to shaft 35 journaled in bearings on the frame FII. The shaft 35 is placed in driving connection with the pulley shafts 26, $26^1$, respectively by means of bevel gears 36 and $36^1$ respectively, which are driven by bevel gears 37, $37^1$ mounted on shaft 35. See in this connection, Figure 2 of drawings.

In Figures 2 to 10 inclusive of the drawings, I have illustrated the topping mechanism including the individual cutters, together with means for adjusting the same for topping operations. With particular reference to Figures 2 to 5, inclusive, it will be observed that a frame FIII is rigidly fastened to frame FII adjacent the longitudinal center thereof and supports a pair of beet top confining rods 38. The rods 38 conveniently are mounted for both side and vertical movement and to effect such a result I connect these rods to rocker shafts 39, which are mounted in bearings 40 carried by the frame FIII. To urge the rods 38 inwardly against the beet tops while at the same time to permit side and vertical movement of such rods, I provide a pair of rods 42 which are connected to rocker-shafts 43 mounted in bearings carried by the frame FIII, and also movably connected at 38A to the rods 38, and I also provide a pair of springs 44 secured to the rocker shafts 43 for pressing the rods 38 through the connecting rods 42, toward one another as the beets slide along under the rods 38 toward the cutters.

In order to prevent displacement of the rods 38 which might result from the passage therebetween of relatively large beets tending to spread the rods apart, I provide return means for the rods 38. These means are connected to the rocker shafts 39 and include a pair of collars 39² at the ends of the shafts which together with nuts 39³ hold U shaped members 39⁴. The U shaped members 39⁴ support pins to which links 39⁵ are attached. Links 39⁵ are connected to L arms 41 which carry at their extremities weights 41A. As the rods 38 are spread apart by the passage of large beets, the weights 41A urge the rods to their initial position. If desired, springs can be substituted for the weights 41A.

In order that the cutters will follow the up and down movement of rods 38 and rods 42, I mount rods 45 upon the same rocker shafts as the rods 42 are mounted; namely, rocker shafts 43. Cutter holders 46 are slidably connected to the rods 45 and serve to adjustably hold cutters 47 which preferably are formed to a curved shape to give the best performance. Set screws 48 and 49 are provided for adjusting the positions of the cutters 47. For counter-balancing the elements forming the topping mechanism, I fasten arms 50 to the rocker shafts 43, see Figure 3 of the drawings, and affix the proper weights 51 to the arms 50 to offset the weights of the parts 38, 42, 45, 46, and the cutters 47.

To avoid interference between the topping mechanism and the beet elevator of the device when the rear of frame FII is lowered, the arms 52, which are hinged to rods 53 at lower end, lift upward. Arms 52 carry collars 52A at their outer ends. The collars 52A are slidably connected to the cutter holders 46 and, as the frame FII is lowered, the collars with cutter holders contact with the elevator and cause the cutter holders and cutters to move upward out of the way.

In Figures 5 and 7 to 10 inclusive, there are illustrated enlarged details of the mechanism for actuating the topping means, such mechanism being supported on frames FIV and FV, which are secured to frame FII. A chain drive from wheel 32 connected with a clutch on the rear axle of the vehicle is used to actuate the topping mechanism and, to effect this result, a sprocket wheel 54 is mounted on the pin S, and bolted to sprocket wheel W, and a chain 55 is trained around the sprocket wheel 54. The chain 55 is also trained around a sprocket wheel 56 secured to shaft 56A which is journaled in bearings on frame FIV. See, especially, Figures 1 and 9 of the drawings. I also provide a gear 57 on shaft 56A which meshes with a pinion 58 secured to a shaft 59, which is journaled on bearings on the frame FIV. The shaft 59 also carries a relatively large toothed wheel 60, and in the embodiment of actuating means for the topping mechanism illustrated in the drawings, I include a double curved rod 62 for engagement with the teeth of the toothed wheel 60, the rod 62 being secured to a stub-shaft 63 journaled in a slide-block 64 which is carried by a slide-bar 65 secured to frame FIV. The shaft 63 carries a small bevel gear 66 which is driven by a bevel gear 67 slidably mounted in a keyway formed in a shaft 68 which is journaled in an offset portion of frame FIV. See, in this connection, Figure 10 of the drawings. A hook 69 is provided for confining the bevel gear 67. Fastened to the shaft 68 is a bevel gear 70 which is adapted to be turned by a bevel gear 71 secured to a shaft 72 which is journaled in bearings mounted in frames FIV and FV. In addition to the foregoing means for actuating the topping mechanism, I provide a bevel gear 73 which is fastened to shaft 72 and which is turned by a bevel gear 74 secured to a shaft 75 which is journaled in bearings on frame FV. Connected to shaft 75 and adapted to rotate the same is a rod 76 which is contacted by the beet tops and moved thereby as the beet tops are moved or conveyed by and between the belts 31 and 31¹ toward the cutters 47.

Normally, and when the machine is at rest, the rod 76 is in the position shown by full lines in Figure 4 of the drawings. Also, with the machine at rest as well as when the vehicle is being advanced over a road, the double curved rod 62 is out of engagement with the large toothed wheel 60 on shaft 59 and resting on the smooth peripheral surface of wheel 60A, see Figures 9 and 10 of the drawings. However, during beet pulling and topping operations, the double curved rod 62 is moved into engagement with the toothed wheel 60 by the contact of beets with the rod 76 which moves the same thereby turning shaft 75, gears 74 and 73, shaft 72, gears 71 and 70, shaft 68, gears 67 and 66, and stub-shaft 63 to place rod 62 into engagement with toothed wheel 60. This action also moves the sideblock 64, thereby actuating the topping mechanism.

The continued advance of the vehicle brings into play the action of a link 77 which is connected to the slide-block 64 and an arm 78 which is secured to rod 53. See in this connection, Figures 4 and 5 of the drawings. The topping mechanism also includes an arm 79 which is also connected to one rod 53, and a link 80 connecting arm 79 to an arm 81 which is fastened to the other rod 53¹. Actuation of link 77 and arm 78 by the driving connection from the wheel Wв, or sprocket wheel 32 if motor is used, through toothed wheel 60 causes swinging of both arms 52, which are fastened to rods 53, thereby causing the cutter holders 46 and cutters 47 which are held at the outer ends of rods 52 to swing inwardly and operate to top the beets as they are conveyed to the position of the cutters. The cutters remain in their inward swung position for but an instant and just long enough to chop the tops from the beets, and are promptly returned to their initial or non-cutting position by the action of a weight or spring hereinafter described.

To assist the turning movement of shaft 72 when it resists turning at one end, I have provided a spring 82 thereon which will twist upon resistance to turning of the shaft, see Figure 4 of the drawings.

In accordance with the invention, I have provided means for returning the topping mechanism to starting or initial position immediately after topping of each beet. These means include a link 83 connected to L-arm 77, 78, and also connected to an L arm 84 which is secured to an upright 85 on frame FII, see Figure 4 of the drawings. The L arm 84 carries a weight 86 which serves to return the linkage 77, 78, arm 79, link 80 and arm 81 to their original positions and throw the slidable block 64 back to its initial position and double curved rod 62 out of engagement with toothed wheel 60. If desired, a spring may be substituted for the weight 86 to effect this result.

After the beets have been topped, the topped beets conveniently are conveyed to a hopper at the rear of the vehicle. Any desired conveying means may be employed and in the present embodiment I have utilized an elevator which is chain driven from the driving wheels WB of the vehicle, or wheel 32 on rear axle when motor driven, and which includes a flat belt supported between side-plates. As illustrated in Figures 1 and 2 of the drawings, I provide a sprocket wheel 87 which is fastened to a shaft 87A journaled in bracket B fastened to main frame FI of the vehicle. The sprocket wheel 87 is arranged to be driven by the same chain which drives sprocket wheel W on pin S, but if desired a separate sprocket wheel may be mounted on pin S and a separate chain between the same and wheel 87. A gear wheel 88 is fastened to shaft 87A and is arranged to mesh with a gear wheel 89 secured to a shaft 89A journaled in bracket B secured to frame FI. Driving wheels 90 for driving beet elevator chain 91 are mounted on shaft 89A, see Figures 22 and 23 of the drawings. At the upper end of the elevator, chain driving wheels $90^1$ are provided and mounted on a shaft in bearings on a bracket fastened to hopper of the vehicle. The elevator is provided with side pieces 91A for confining the beets upon a conveyor belt 91B which is fastened to the chain 91.

Referring again to the beet topping mechanism and especially to the showings in Figures 5 and 6 of the drawings, it will be observed that I have provided follow-up means for preventing displacement of the mechanism during the topping operation which might otherwise occur as a consequence of the excessive gripping of the beet leaves and possible twisting of the belts 31, $31^1$ during their forward movement. These follow-up means include links 95 which are pivotally connected to arms 52 and also to links 96, the latter being connected to L-arms 97 which in turn are connected to movable sleeves 97A on the arms 52. The L-arms 96 are pivotally connected to arms 97B of frame FIII. Small rollers 97C are carried by the sleeves 97A and bear against the rods 52 thus facilitating the movement of the above described linkage.

The topped beets are delivered from the beet elevator into a hopper disposed at the rear of the vehicle and rigidly fastened to the frame FI. Means are provided for the automatic opening of the hopper doors for the discharge of topped beets and for automatic closing of hopper doors after discharging. These means are illustrated in detailed and enlarged views in Figures 14 to 20 inclusive of the drawings. With particular reference to Figures 14 and 15 of the drawings, it will be observed that I provide an L lever 98 which is connected with link 99 which in turn is connected to an arm 102 on a rod 103 which is secured to an inclined bottom 104 of the hopper. Hopper doors 105 are provided and are adapted to swing outwardly to dump the topped beets to the sides of the vehicle when the load pressure of the beets on the inclined bottom 104 becomes sufficient to press the doors outwardly, thus automatically discharging the topped beets as the pressure thereof overcomes the closing pressure against the doors. Release hooks 105A, see Figure 20 of the drawings, are provided on the doors 105 for actuation by a hand-lever, hereinafter described, when it is desired to open the doors 105 of the hopper before the hopper bottom 104 swings to one side or the other of the vehicle. The hopper doors also have side wings 105B to prevent beets becoming wedged between door and door sides during closing.

The weight of the topped beets as they seat upon the inclined bottom 104 of the hopper bears against the doors 105 as well as against rods 106, fastened in the doors. The movement of rods 106 causes movement of arms 107, $107^1$, carrying rollers, which are fastened to rods 106, see Figures 14 and 20 of the drawings. The rollers on arms 107, $107^1$ are urged against springs 110, $110^1$ which are fastened to the sides of the hopper and which carry rollers 110A in bifurcated brackets fastened thereto. Pressure upon springs 110, $110^1$ forces the same outward past bars 111, $111^1$ which are disposed between rollers 111A and 111B mounted in boxes 112, $112^1$ fastened to the side of the hopper. As the springs 110, $110^1$ are pressed outwardly, the bars 111, $111^1$ drop behind the rollers 110A and lock the springs 110, $110^1$ in their outward positions thereby allowing arms 107, $107^1$ to pass to the positions indicated in Figure 15 of the drawings and permitting the opening of the doors 105 to discharge the beets. During the closing of the doors, as hereinafter described, bifurcated rods 113, $113^1$, which are pivotally fastened to extensions 107A on arms 107, $107^1$, are urged upwardly. The rods 113, $113^1$ loosely support links 113A which are pivotally fastened to the hopper and to the bars 111, $111^1$. On the upward movement of rods 113, $113^1$, pins 113B on levers 113A are engaged and the levers 113A are thus pivotally swung so as to raise bars 111, $111^1$ thereby releasing the rollers 110 A and permitting the return of springs 110, $110^1$ to their initial positions with hopper doors closed. See Figure 21 of the drawings.

The mechanism for automatically opening and closing the hopper doors includes a stub-shaft 114 journaled in frame FVI which is fastened to the side of the hopper. A wheel 115 is secured to shaft 114. Details of the wheel 115 are shown in Figures 16, 17 and 18 of the drawings and it will be observed that this wheel includes an inner flange 115A and an outer flange 115B, a portion 115D of which is hingedly connected to the side of the wheel. An arm 115C extends between the inner flange 115A and outer flanges 115B and is fastened to the side of the wheel. An extension spring 115E is fastened to the section 115D of the outer flange and anchored to the side of the wheel. If desired, the hinged section 115D together with the spring 115E may be placed on the ratchet side of the wheel. Spring 115E serves to bring the section 115D back to its initial position after arm 115C has moved the roller on L arm 117 outwardly, hereinafter described.

As hereinabove mentioned, the pressure against rods 106 in the bottom of the hopper causes movement of arms 108, $108^1$ and 109, $109^1$ which are connected to rods 106. Attached to arms 108, $108^1$ are connecting rods 116, $116^1$ which connect with L arms 117, $117^1$ carrying rollers at their outer ends. The L arms 117, $117^1$ are mounted on pins 118 in the frame FVI. The arms 109, $109^1$ are attached to connecting rods 119, $119^1$ which connect with L arms 120, $120^1$, carrying rollers, which are mounted on the pins $118^1$.

Upon opening of the left door 105 of the hopper by the pressure of the beets at that door, see Figure 15 of the drawings, the L arm 117, with roller, swings inside of the outer flange 115B of the wheel 115, while the L arm 120, with roller, swings outside of the inner flange 115A through the cut-out section of the inner flange of the wheel. Normally, and with the hopper door closed, spring 110 holds the L arms 117 and 120, with rollers, away from the flanges of the wheel 115 but when spring 110 is pressed outwardly to locking position, the L arms 117 and 120, with rollers, are moved as above described into contact with the wheel flanges which hold the rollers until arm 115C has passed roller on arm 117 which allows arm 117, with roller, to swing inward, thus opening hopper door. In order to prevent the forcing back of door 105 while in a partially open position, I provide a lug 115F on the side of the inner flange 115A of the wheel which contacts with a projection 120A on an extension of L arm 120, thus sliding arm 120 out of contact with the flange 115A and the roller on L-arm 120 clears the wheel flange allowing hopper door to open. See, in this connection, Figures 14, 15, 16 and 19 of the drawings.

In the event that the bottom 104 of the hopper swings in the other direction, the weight of the beets and pressure is directed against the right door 105 of the hopper, the elements 107¹, 108¹, 109¹, 110¹, 117¹, with roller, 119¹ and 120¹, with roller, come into play and the same action occurs on that side of the vehicle and hopper as in the case of the opposite side discussed above in describing the automatic hopper-opening elements on the left of the hopper.

The closing of the hopper doors is effected by the rotational movement of wheel 115 and the wheel preferably is moved by chain drive connecting with the shaft 121A carrying the beet elevator wheels 90¹ at the top of the elevator. In the embodiment illustrated, see Figures 2 and 15 of the drawings, a bevel gear 121 mounted on shaft 121A meshes with a bevel gear 121¹ which is secured to a stub-shaft 121B journaled in bearings in a bracket mounted on the hopper. A sprocket wheel 122 is fastened to stub-shaft 121B and a second sprocket wheel 123 is mounted on shaft 114. A chain 124 is trained around sprocket wheels 122 and 123. By these connections, wheel 115 is driven by the movement of the beet elevator, which in turn moves in accordance with the advance of the vehicle across the field. To prevent reverse movement of the wheel 115, ratchet wheel 115H is mounted on shaft 114 which is secured to the side of the wheel 115, and a spring pawl 123A is pivotally mounted on the side of the sprocket wheel 123, the pawl disengaging the ratchet 115H on reverse movement of the sprocket wheel 123.

As hereinabove mentioned with respect to the automatic opening of the doors, the flanges 115A and 115B of the wheel 115 are so arranged that they hold the arms 117 and 120, with rollers, a sufficient interval of time to permit the opening of the door 105. This is also true with regard to the flanges holding arms 117¹ and 120¹, with rollers, when the discharging occurs at the other side of the vehicle giving that door 105 sufficient time to fully open. A sufficient interval of time elapses to permit the discharge of the beets before arm 115C on side of wheel 115 comes around to engage the roller on the arm 117 to move it outside of outer flange through section 115D. The release of these rollers returns the L arms to their initial position and the doors close, assisted by the return action of the springs 110, 110¹ after being released from their outer locked positions by the upward movement of bars 111, 111¹ due to the action thereon of levers 113A which are moved by rods 113, 113¹.

In order to raise the frame FII from working position to road or turning positions, I provide a hand lever 125 within easy reach of the operator of the vehicle from operator's seat 125¹. The lever 125 is movably mounted upon a bracket rigidly connected to frame FI and connected with rod 126 which in turn is connected to arm 4A on transverse rod 3 mounted on uprights 2. The lever 125 conveniently is pivoted to the bracket at pin 127. Movement of lever 125 to raise and lower the frame FII also moves a clutch on the rear axle of the vehicle to place sprocket wheel 32, employed to drive the conveyor belts 31, 31¹, out of and into gear. The clutch movement is effected by means of a link 128 which is connected to an L-arm 129, the latter being connected to the clutch by connecting rod 130 and clutch lever 131, see Figures 2 and 13 of the drawings. A hook 125A is provided on frame FI adjacent to the operator's seat 125¹ for holding the lever 125.

The vehicle is steered from the operator's seat 125¹ by a steering wheel and column 132, the column being connected to the front wheels through an arm 133, link 134 connected to the arm 133, and steering knuckle 135, together with a tie-rod 136.

Means are provided for making short turns by the vehicle, which include a clutch 137—see Figure 13 of the drawings—operable by a foot pedal 138, and spring 138A to return pedal, there being no differential on the rear axle connected to the driving wheels WB, and also include rod 139, L-arm 140, which connect the pedal 138 to the clutch lever 142 through link 141, see Figures 12 and 13 of the drawings. Actuation of the clutch 137 disengages the right drive wheel WB to permit swinging of the vehicle on a relatively short turn. It is to be observed that link 141 is adjustably mounted in order that it can be made to function in different lengths whereby the machine can be adjusted to differences in beet rows.

Mounted on uprights secured to frame FI as well as on the hopper at the rear of the belts 31, 31¹ and adjacent to the cutters 47, 47¹, is a chute 143 for receiving and discharging the beet tops after they have been severed by the cutters. The chute 143 extends rearwardly and terminates beyond the hopper at the rear of the vehicle.

To provide for differences in width of beet rows in the various fields, I employ collars 144 on the front and rear axles, which may be mounted both on the inside and outside of the wheels if desired. Any width of collars 144 may be used and the collars also may individually vary in width.

In addition to the hand lever 125 above mentioned, I also provide hand lever 160, as well as hand lever 160¹, to apply needed pressure against hopper door release hooks 105A to permit discharge of beets before hopper bottom 104 is swung to the other side.

If desired, although it is not essential, L-levers 162, 162¹ can be mounted on frame FVI, and one arm of each thereof can be caused to bear upon a lug 115G on the wheel 115, see Figure 16 of the drawings. As the arm 115C of wheel 115 swings around forcing the rollers on arms 117, 117¹ outwardly, springs 110, 110¹ move the rollers farther outwardly against a portion of each of the L-levers 162, 162¹ while another portion of each of such L-levers is urged against the lug 115G on wheel 115 in the direction of its rotation, thereby requiring the springs 110, 110¹ to return more slowly upon their release when levers 111, 111¹ are shoved upwardly.

The foregoing described machine is relatively simple to operate and can be handled by a single operator. Some of the elements, such as the last described set of levers 162, 162¹, are accessories rather than inherent parts of the machine, and the use of an engine, with its conjunctive driving mechanism, is purely optional as the machine will perform its several functions if the vehicle is propelled by other means.

It is to be understood that the appended claims are to be accorded a range of equivalents commensurate with the scope of the prior art.

I claim:

1. A machine for pulling and topping beets comprising a vehicle adapted to be advanced over a field of beets, means on said vehicle for severing the beets from the soil and for lifting the same upon the vehicle upon the advance of said vehicle over the field, means on said vehicle for gripping the beet tops and for conveying the beets rearwardly on said vehicle, a cutter for topping the beets during the advance of said vehicle; said cutter being actuated to top the beets by the movement of the beets toward the cutter, means for actuating said gripping and conveying means during the advance of said vehicle, a hopper on said vehicle for receiving topped beets, means for delivering topped beets from said cutter to said hopper; said delivering means being adapted to be actuated by the advance of said vehicle, a door on said hopper; said door being adapted to open automatically by the pressure of the topped beets in said hopper, and means on said vehicle and actuated by said delivering means for automatically closing said door after discharge of topped beets from said hopper.

2. A machine for pulling and topping beets comprising a vehicle adapted to advance over a field of beets, a movable frame supported on said vehicle and adapted to be moved into a working position and a non-working position, means for lowering said frame into working position, means on said frame for severing beets from the soil and for lifting the beets onto said vehicle, a pair of endless belts movably supported to pull the beets from the ground to positions between said belts, means for moving said belts to convey the beets rearwardly on said vehicle, a cutter supported on said frame and adapted to be actuated to top the beets by the movement of the beets toward the cutter, a hopper on said vehicle, means for delivering topped beets from said cutter to said hopper, means for discharging topped beets from said hopper, said last named means being actuated automatically by the weight of topped beets in said hopper, means on said vehicle for automatically closing said hopper after discharging the topped beets, and means for moving said frame to non-working position.

3. A machine for harvesting beets comprising in combination, a vehicle adapted to advance over a field of beets, means on said vehicle for pulling the beets from the soil and lifting the same onto said vehicle, means on said vehicle for topping the beets, and means for discharging the beets from said vehicle; said first named means including a pair of blades for severing the beets, a pair of endless belts for gripping beet tops and conveying the beets rearwardly on said vehicle, and mechanism for actuating said belts during the advance of the vehicle; said second-named means comprising a cutter on said vehicle adapted to be actuated to top the beets by the movement of the beets rearwardly on said vehicle; and said third-named means comprising a hopper on said vehicle for receiving topped beets, an elevator actuated by the advance of said vehicle for delivering topped beets from said cutter to said hopper, a door on said hopper adapted to be automatically opened by pressure of topped beets thereon, and mechanism actuated by the movement of said elevator for automatically closing said door upon discharge of topped beets from said hopper.

4. In a machine for harvesting beets, a hopper, a door on said hopper; said door being adapted to be automatically opened by the weight of topped beets thereon, means for locking said door in open position for a predetermined period, and means actuated by the advance of the machine for automatically closing said door upon the termination of said predetermined period.

5. In a machine for harvesting beets, a hopper, a side door on said hopper; said door being adapted to be automatically opened by the weight of topped beets in said hopper to discharge the beets from said hopper out of the path of the machine, means for locking said door in open position for a predetermined period, and means actuated by the advance of the machine for releasing said first named means at the end of said predetermined period.

6. A beet harvesting machine comprising a vehicle, means for severing beets from the soil and lifting the same onto said vehicle, means on said vehicle for topping said beets, a hopper, means for conveying the topped beets to said hopper, a side door on said hopper; said door being adapted to be automatically opened by the weight of topped beets in the hopper to discharge beets out of the path of said vehicle, means actuated by the advance of the vehicle for locking said door in open position for a predetermined period, and means for releasing said locking means upon the termination of said predetermined period.

7. A machine for harvesting beets comprising a vehicle adapted to be advanced over a field of beets, means on said vehicle for severing the beets from the soil and for lifting the same upon the vehicle during the advance of the vehicle over the field, means on said vehicle for gripping the beet tops and for conveying the beets rearwardly on said vehicle, a cutter for topping the beets and adapted to be actuated during the advance of the vehicle, a hopper on said vehicle for receiving topped beets, means for delivering topped beets from said cutter to said hopper; said delivering means being adapted to be actuated by the advance of said vehicle, a door on said hopper; said door being adapted to open automatically by the weight of the topped beets thereon, and means on said vehicle and actuated by said delivering means for automatically closing said door after discharge of topped beets from said hopper.

JOSEF FECHTNER.